United States Patent [19]
O'Hare

[11] Patent Number: 5,669,330
[45] Date of Patent: Sep. 23, 1997

[54] AQUATIC ORGANISM HABITAT DEVICE

[76] Inventor: Christopher F. O'Hare, 22 Harbour Dr. South, Ocean Ridge, Fla. 33435

[21] Appl. No.: 474,749

[22] Filed: Jun. 7, 1995

[51] Int. Cl.⁶ ................................................ A01K 61/00
[52] U.S. Cl. .................................... 119/215; 119/221
[58] Field of Search ........................ 119/208, 215, 119/217, 221, 223, 237, 238, 220

[56]  References Cited

U.S. PATENT DOCUMENTS

| | | | |
|---|---|---|---|
| 1,515,547 | 11/1924 | Burkey | 119/220 |
| 1,815,521 | 7/1931 | Miyagi | 119/237 |
| 3,294,061 | 12/1966 | Hanks | 119/237 |

FOREIGN PATENT DOCUMENTS

| | | | |
|---|---|---|---|
| 2613186 | 10/1988 | France | 119/237 |

*Primary Examiner*—Robert P. Swiatek
*Attorney, Agent, or Firm*—Malin, Haley, DiMaggio & Crosby, P.A.

[57] ABSTRACT

A synthetic habitat device providing for the enhancement of open estuary systems with regard to the survival potential of juvenile fish. The device is an assembly composed of a horizontal member with a plurality of cylindrical downward curving appendages. The device is permanently attached to existing bulkhead structures bordering an aquatic system and is located adjacent to and below the surface of the water at low tide elevation. The device provides substrate for colonization by marine organisms and sanctuary to juvenile fish in various developmental stages. The device is a substitute for indigenous plant structure and substrate which has been diminished or eliminated from a natural estuary system.

10 Claims, 2 Drawing Sheets

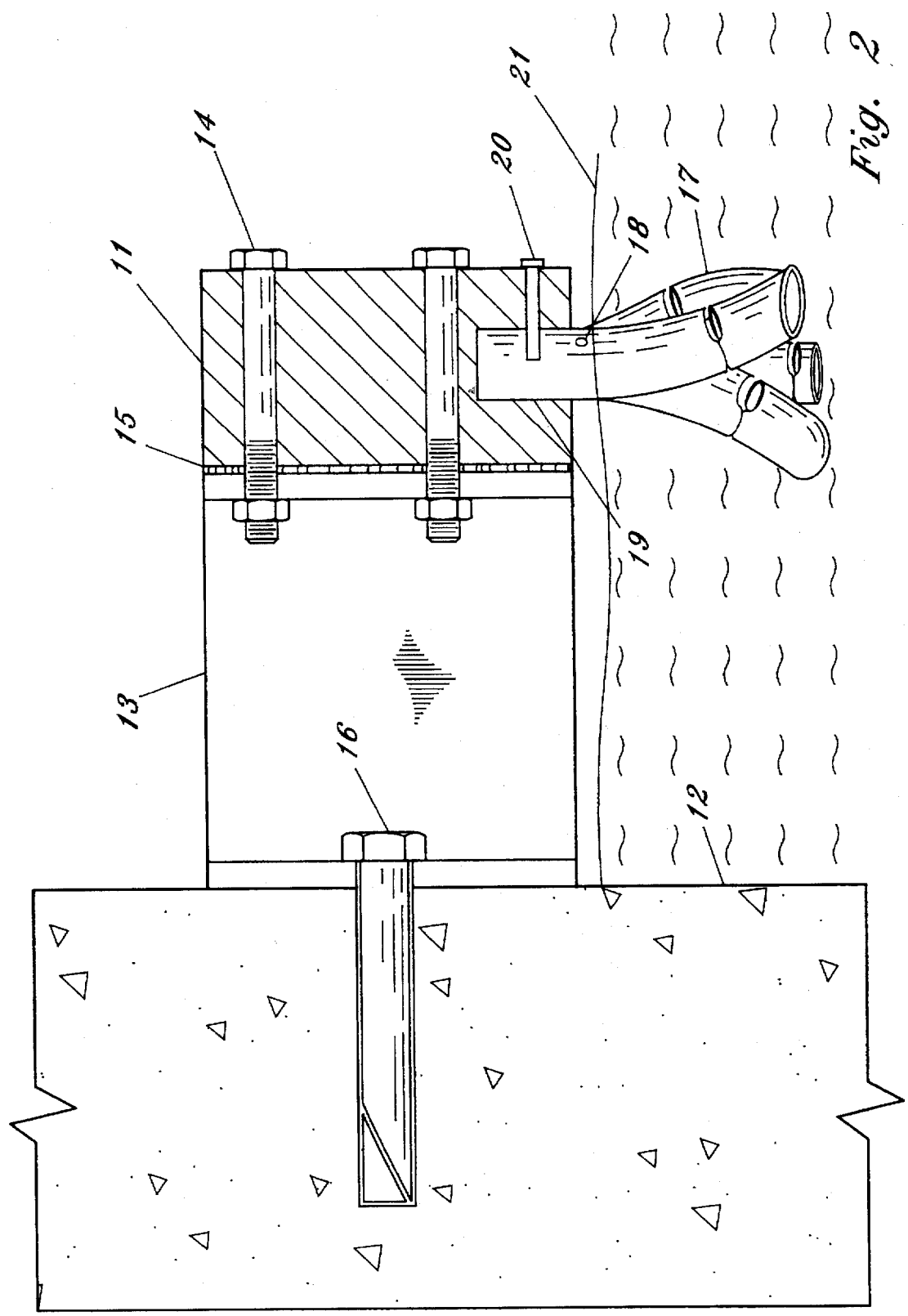

AQUATIC ORGANISM HABITAT DEVICE

BACKGROUND OF THE INVENTION

1. Field of the Invention

The present invention relates to an artificial fish habitat and in particular to a system of one or more synthetic devices, adapted for attachment proximal a shoreline seawall or bulkhead, whose physical characteristics and shape duplicate the beneficial effects of natural estuary shoreline vegetation. Specifically, the present invention reduces wave energy impacting the shoreline and provides shelter from predation and nurturing of juvenile fish.

2. Description of the Prior Art

Increased real estate and roadway development along waterfront and wetland areas has resulted in the removal or destruction of indigenous estuarine flora. As waterways and marsh areas are widened and deepened, property lines bordering shorelines are often fortified with bulkheads and seawalls. As a result, shoreline habitat, which includes marsh grasses and mangrove, are eliminated or vastly reduced. The mangrove in particular is extremely important to such estuarine habitats. This family of dicotyledonous trees forms large colonies along the margins of southern salt marshes and estuary systems. Mangrove trees have extensive root system and the roots typically provide: shelter for fish in various stages of development; and, substrate for colonization by aquatic organisms, and entrapment of water borne nutrients thereby providing sustenance for numerous aquatic organisms and developing fish. Many such fish mature into valuable game fish or become food for larger game fish which breed in open offshore systems. Colonizing organisms including invertebrates, algae, and a wide range of aerobic bacteria, are essential for the absorption and oxidation of nutrients and the subsequent maintenance of water quality. Consequently, the loss of this habitat and the replacement of the banks undulant and cratered declivity with a vertical bulkhead results in a corresponding loss in juvenile fish stocks and increases stress on the aquatic system. While the installation of fortified seawalls and bulkheads stabilizes adjacent soil it provides little or no habitat for spawning and developing fish.

In recent years, proposals for wetland development or projects that adversely impact adjacent wetland systems have been required by regulatory government agencies to protect those systems or provide mitigation in the form of new wetland development of equal or greater scope. This type of mitigation has been marginally effective because of the difficulty in duplicating the complex interactive systems balanced in a productive functioning ecosystem. Further, this type of mitigation has no restorative effect on the actual site being impacted by development. Additionally, some form of mitigation is required only of new projects and does not provide for replacement of habitat lost due to development of waterfront and wetland areas prior to enforcement of current environmental regulation.

SUMMARY OF THE INVENTION

A synthetic fish habitat for the increased survival rate of juvenile fish and general enhancement of estuary systems has been developed involving the installation of one or more devices, attached to bulkhead walls in or adjacent to said systems. The device includes an assembly having a horizontal member supporting a plurality of cylindrical downwardly curving appendages. The appendages are spaced at a predetermined distance to achieve a variety of openings in their aggregate vertical planar surface. The openings are further varied by the twisting and bowed nature of the material composition of the appendages. The attachment of this device to existing seawall bulkhead structures is achieved by the use of fabricated brackets of such a configuration that the horizontal member of the invention is fixed at a predetermined distance from the vertical surface of the seawall or bulkhead structure. The brackets have anchoring means such as keyhole openings on the side opposite the device for the purpose of anchoring with stainless steel bolt heads fixed in the structure. The brackets are spaced as required for the suitable support of the device. The device is permanently attached to existing bulkhead structures bordering an aquatic system and is located adjacent to and below the surface of the water at low tide elevation. The cylindrical appendage members function as substitute for indigenous shoreline plant structure and substrate as it benefits fish and other marine organism development. These members are constructed of suitable material so as to be stiff enough to support colonizing aquatic growth and flexible enough to create the effect of submerged roots of a mangrove or similar tree.

In accordance with the concepts of this invention through the provision of a synthetic habitat, it is an object hereof to provide a dynamic physical shelter for the protection from predation of developing juvenile fish.

It is another object of the present invention to provide substrate for colonization by aquatic organisms.

Yet another object of the present invention is to provide entrapment of water borne nutrient providing sustenance for developing fish.

Still another object of the present invention is to be easily installed on a variety of existing bulkhead materials and in a configuration suitable to a variety of bulkhead arrangements.

A further object of the present invention is to be of minimal aesthetic and physical impact to the adjoining property owner so as to minimize resistance to its installation.

It is another object of the present invention to present no obstruction or danger to water borne craft or swimmers beyond that normally expected from shoreline vegetation.

Another object of the present invention is that its parts be of an insoluble nature to prevent the release in solution of any substances detrimental to the purposes of this invention.

Still another object of the present invention is to be a device permanently assembled from polymer and stainless steel materials capable of resisting deterioration from aquatic organisms, temperature fluctuations, ultra-violet radiation and generally harsh aquatic and marine conditions.

It is a further object of the present invention to provide a replacement and/or enhancement of natural fish sheltering systems lost or damaged by waterfront or wetland development.

It is another object of the present invention to provide immediately adjacent to and below the mean low water level, a structure having a maximum amount of shelter area in the portion of the aquatic environment most productive for fish development. Furthermore, the present invention's effectiveness will not be diminished by the buildup of silt or bottom debris as is the case with bottom anchored fish structure.

In accordance with these and other objects which will become apparent hereinafter, the instant invention will now be described with particular reference to the accompanying drawings.

BRIEF DESCRIPTION OF THE DRAWINGS

For further understanding of the present invention, reference may be had to the accompanying drawings in which:

FIG. 2 is a cross sectional view of the embodiment illustrated in FIG. 1.

DESCRIPTION OF THE PREFERRED EMBODIMENTS

Figure 1:
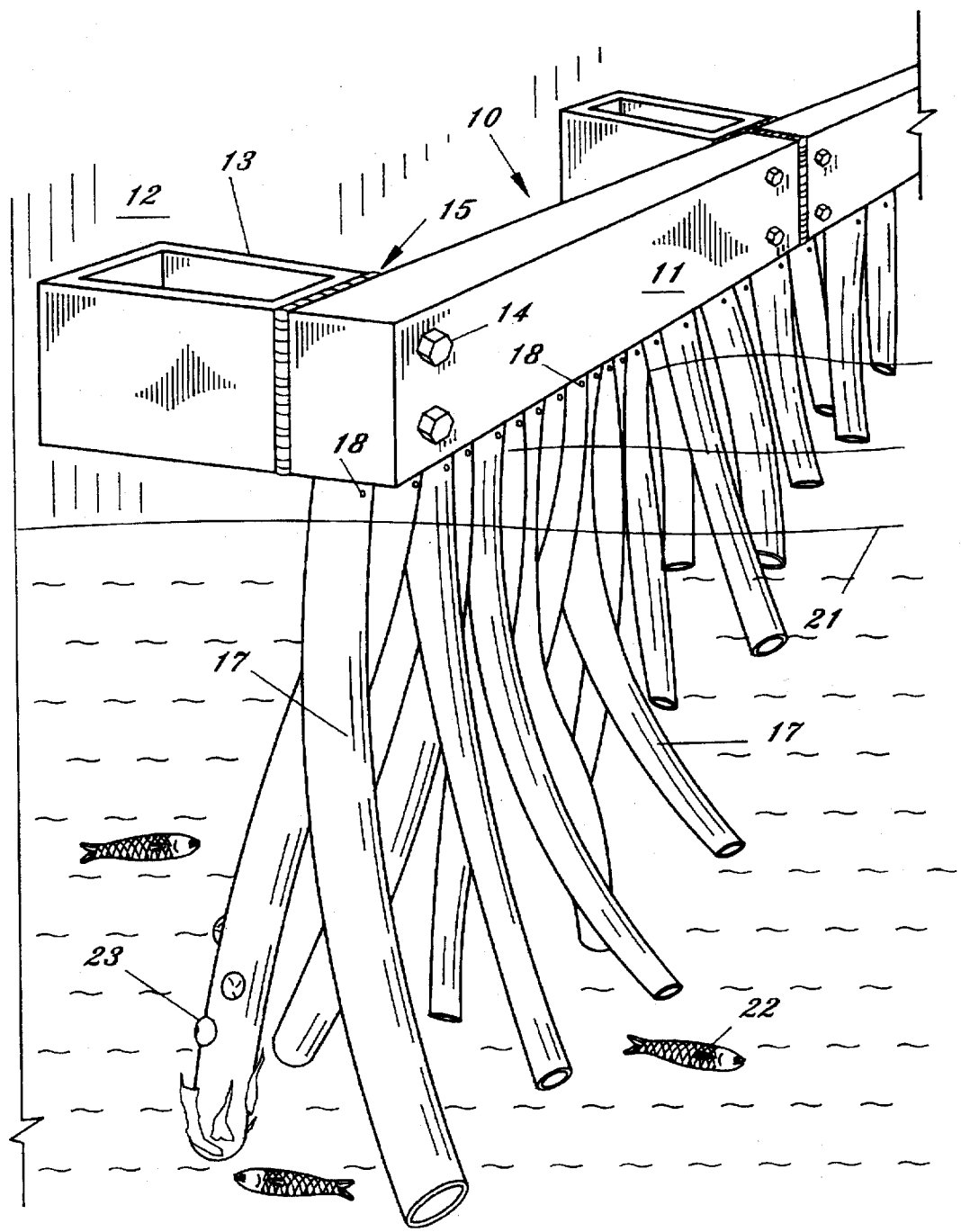
FIG. 1 is an isometric view of one embodiment of the synthetic habitat device insitu.

Referring now to the drawings, and in particular to FIG. 1, there is illustrated a synthetic fish habitat device generally referred to as 10. The device comprises a support means comprising a horizontal support member 11 of rectangular cross section. Horizontal member 11 may be fabricated from any suitable conventional material including fiber reinforced resin, recycled post consumer plastic lumber such as HDPE (High Density Polyethylene), or virgin polystyrene or other molded thermosetting or thermoplastic resin. Horizontal member 11 generally extends parallel to, and in spaced relation with, an existing seawall or bulkhead structure 12 at an elevation slightly greater than mean low tide elevation 21. The bulkhead 12 being an existing structure previously constructed of concrete, wood or steel and provides a mounting structure for member 11.

In the preferred embodiment horizontal member 11 is rigidly connected to bulkhead 12 by an anchor means comprising a bracket 13 fixed to support member 11 with stainless steel fasteners or bolts 14. As depicted in FIG. 1, bracket 13 is rectangular in length, height and width cross section with a hollow core cavity through its full vertical length and may be fabricated of material similar to the horizontal member 11. Further anchoring strength may be achieved between the bracket 13 and the horizontal member 11 with the addition of a suitable adhesive or heat weld 15. Brackets 13 are rigidly fixed to bulkhead 10 with bolt fasteners 16 as best depicted in FIG. 2.

A plurality of cylindrical appendage members 17, fabricated of material similar to the horizontal member 11, extend downwardly from the horizontal member 11, at random angles, for an approximate length of 1 meter. Cylindrical appendage members 17 may be solid or tubular in construction. If tubular, then a small diameter hole 18 is preferably drilled through the cylindrical appendage 17 near its juncture with the horizontal member 11 to facilitate the elimination of any trapped air upon submersion of the device 10 and to equalize the internal pressure of each appendage with the subsequent change in water elevation 21. Cylindrical appendages 17 are spaced along the length of horizontal member 11 at predetermined intervals to provide for a variety of intersections and openings in the planar area defined by the appendages 17. This results in a range of opening sizes in the multiplicity of passageways allowing for the successful sheltering of a variety of size and species of juvenile fish 22. The surface area of the cylindrical appendages 17 provides substrate for colonization of aquatic organisms 23 whose mass further complicates the variety of openings available for the juvenile fish 22.

Further information may be obtained regarding the preferred embodiment by examining the cross sectional view in FIG. 2. The hollowed interior cavity of the bracket member 13 is exposed showing the stainless steel anchor bolt 16 passing through a keyhole shaped opening in the bracket 13 and into the bulkhead wall 12 which is constructed of concrete in this depiction. The stainless steel bolt 16 is of sufficient size to sustain the device against anticipated forces capable of dislodging the device 10. The location of the bracket 13 and the horizontal member 11 above the mean low water elevation 21 facilitates ease of installation with all connections made above water. An alternative embodiment equally satisfactory in the spirit of this invention would locate the horizontal member 11 at the mean high water level with the appendage members 17 extending downward a minimum of ½ meter below mean low water level. Appendage members 17 are secured to the horizontal member 11 by forced insertion into a hole 19 defined by horizontal member 11 of sufficient size to hold the appendage member 17 securely by press fit. Additional strength is achieved by the insertion of a stainless steel or polymer pin 20 through the horizontal member 11 and into each appendage member 17. This fastening method allows for the dynamic character of the appendage member 17 which approximately resembles that of a tree root in the natural system. Various modifications and variations to the embodiments herein chosen for the purposes of illustration will readily occur to those skilled in the art. To the extent that such variations and modifications do not depart from the spirit of the invention, they are intended to be included within the scope thereof which is assessed only by a fair interpretation of the following claims having fully described and disclosed the present invention in concise terms as to enable those skilled in the art to understand and practice the same, the invention claimed is:

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An apparatus for providing a synthetic aquatic organism habitat below the surface of a body of water in a marine environment bordered by a seawall comprising:

an elongate rigid support member having a length;

means for anchoring said support member in spaced relation to the seawall such that said support member is rigidly fixed and horizontally disposed relative to the water surface;

a plurality of tubular appendage members connected to said support member along the length thereof and downwardly depending therefrom, each of said appendage members having a body formed about a generally curved longitudinal axis, whereby a portion of each of said plurality of tubular members is disposed beneath the surface of the water.

2. An apparatus for providing a synthetic aquatic organism habitat below the surface of a body of water in a marine environment according to claim 1, wherein said tubular appendage members are connected to said support member such that said appendage members branch downwardly thereby forming a randomized pattern.

3. An apparatus for providing a synthetic aquatic organism habitat below the surface of a body of water in a marine environment according to claim 1, wherein said tubular appendage members each have a cylindrical outer body surface defining a hollow interior.

4. An apparatus for providing a synthetic aquatic organism habitat below the surface of a body of water in a marine environment according to claim 3, wherein said tubular appendage member outer body surfaces each have a bore therein, communicating with said interior.

5. An apparatus for providing a synthetic aquatic organism habitat below the surface of a body of water in a marine environment bordered by a seawall comprising:

an elongate rigid support member having a length;

at least one bracket fixed to said support member, said at least one bracket rigidly fixed to the seawall such that said support member is disposed at an elevation greater than the mean low tide elevation and extends parallel to, and in spaced relation with, the seawall;

a plurality of elongate tubular appendage members, each of said appendage members having a randomly curved longitudinal axis;

said plurality of appendage members connected to said support member and spaced along the length thereof, and extending downward from said support member such that a portion of each of said plurality of tubular members is disposed beneath the surface of the water.

6. An apparatus for providing a synthetic aquatic organism habitat below the surface of a body of water in a marine environment, said apparatus comprising:

a support means fixed relative to a marine environment by an anchoring means, said support means having a length;

a plurality of flexible elongate appendage members connected to said support means, said appendage members each having an outer surface formed about a generally curved longitudinal axis, each of said appendage members extending generally downwardly from said support means such that a portion of said outer surface is disposed beneath the surface of the water;

said appendage members spaced at predetermined distances along the length of said support means whereby said downwardly extending appendage members form a randomized pattern below the mean surface of the water.

7. An apparatus according to claim 6 wherein each of said elongate appendage members has a generally cylindrical outer surface.

8. An apparatus according to claim 7, wherein each of said appendage members is solid.

9. An apparatus according to claim 7, wherein each of said appendage members defines a substantially hollow interior.

10. An apparatus according to claim 9, wherein each of said appendage member outer surfaces defines an aperture communicating with said interior, said outer surface aperture disposed above the surface of the water for allowing the escape air within said hollow interior upon submersion and to equalize air pressure with said hollow interior.

* * * * *